Sept. 20, 1971  S. GERSTLER  3,606,332
BOARD GAME APPARATUS
Filed Dec. 16, 1968  2 Sheets-Sheet 1
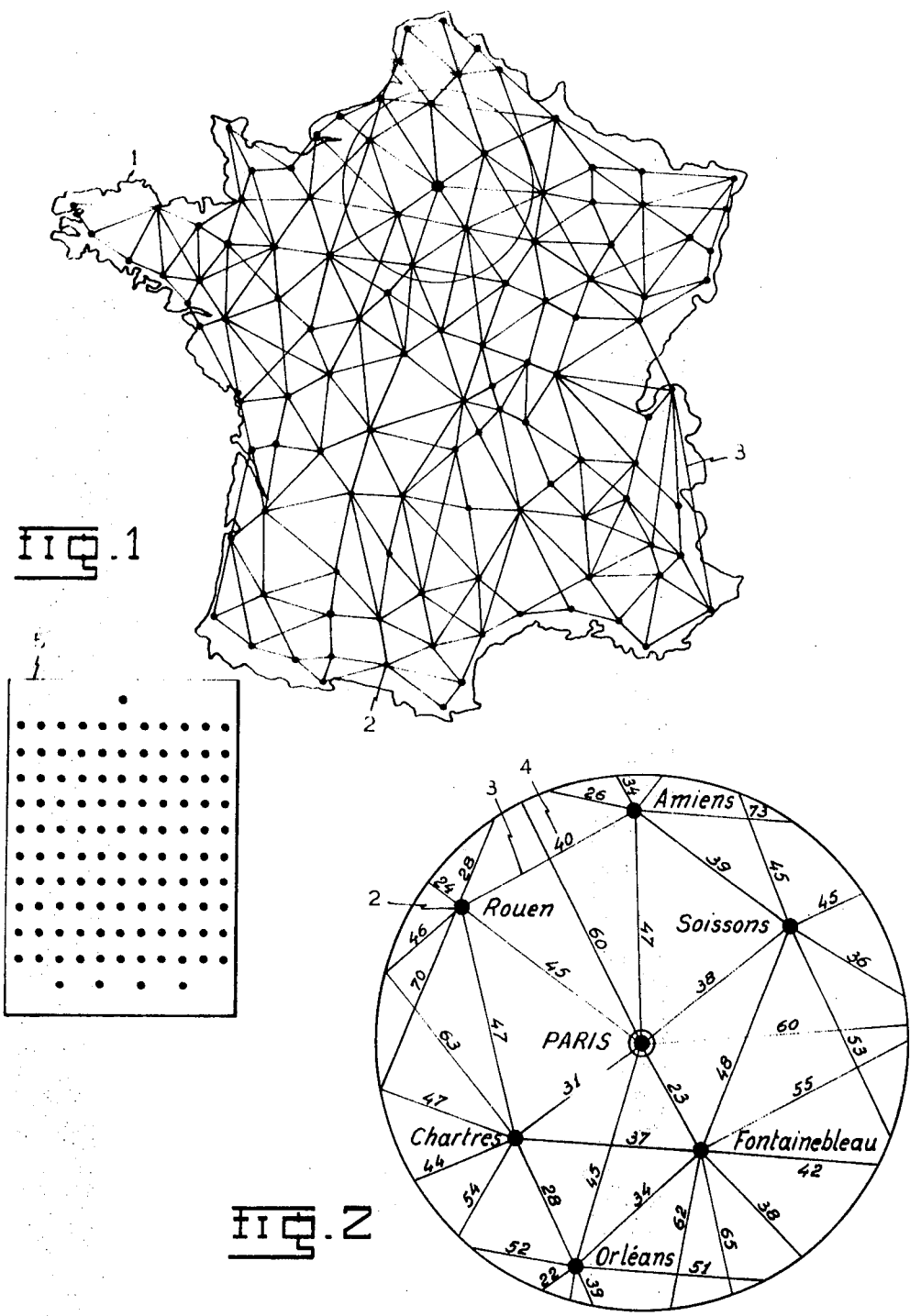
INVENTOR
SALOMÉ GERSTLER
BY WILLIAM A. DRUCKER
ATTORNEY

Sept. 20, 1971  S. GERSTLER  3,606,332
BOARD GAME APPARATUS

Filed Dec. 16, 1968  2 Sheets-Sheet 2

| 1000 | 100 | 10 | 1 |
|---|---|---|---|
| 9 ● | 9 ● | 9 ● | 9 ● |
| 8 ● | 8 ● | 8 ● | 8 ● |
| 7 ● | 7 ● | 7 ● | 7 ● |
| 6 ● | 6 ● | 6 ● | 6 ● |
| 5 ● | 5 ● | 5 ● | 5 ● |
| 4 ● | 4 ● | 4 ● | 4 ● |
| 3 ● | 3 ● | 3 ● | 3 ● |
| 2 ● | 2 ● | 2 ● | 2 ● |
| 1 ● | 1 ● | 1 ● | 1 ● |
| 0 ● | 0 ● | 0 ● | 0 ● |

INVENTOR
SALOMÉ GERSTLIR

BY WILLIAM A. DRUCKER
ATTORNEY

United States Patent Office 3,606,332
Patented Sept. 20, 1971

3,606,332
BOARD GAME APPARATUS
Salomé Gerstler, Avenue Minerve No. 21,
Brussels 19, Belgium
Filed Dec. 16, 1968, Ser. No. 783,837
Claims priority, application Belgium, Jan. 10, 1968,
53,142
Int. Cl. A63f 3/02
U.S. Cl. 273—131BB    3 Claims

ABSTRACT OF THE DISCLOSURE

Means for playing a board game comprise a plurality of duplicate copies of a map, one for each player, each said map comprising a plurality of perforations each representing a town in a country, and a plurality of counting units for insertion in said perforations, markings on the map indicating distances between perforations. Further the game playing means include a device for adding distances in the form of a board having columns of numbers.

---

This invention relates to a game of skill by means of which players, mainly children, can extend their knowledge of geography and develop their powers of observation.

It features in particular the fact that it is exclusively based on the child's intelligence and powers of reasoning, there being no element whatsoever of "chance" in it, which is a very rare thing in a game.

In this game, a child's wits are used and he can make full use of his powers of observation and sense of direction, as well as his logic and knowledge of arithmetic. In it, the child has to display an orderly and methodical mind, foresight and tactical sense.

While it is designed primarily to provide children with a fascinating and educational pastime, it is also a valuable guide for parents and teachers. The latter can to some extent measure the child's intellectual capacity by means of the results obtained in this game, and by making comparisons between different children of the same age. Moreover, the value of this test will usually be confirmed by a very interesting fact: it will be noted that children who are good at school are the ones who achieve the best results in this game.

While it is, as stated above, of a kind which will develop certain aspects of a child's general intelligence, it will also lead to a tangible improvement in two invaluable spheres of teaching.

In fact, apart from the amusement afforded by the competitive element, this game enables children to perfect their knowledge of geography and also to gain practice in counting.

The game covered by the invention mainly features the fact that it comprises several copies of a map, one for each player, each map comprising a certain number of perforations for the insertion of pegs, each of these holes representing a town in a country, and each player has to go through all the towns on his map to reach a town appointed as the final destination; there are penalties to make it possible to adjudge someone the winner.

A better understanding of the invention will be gained by reference to the description together with the accompanying drawing which shows, as an example only, a method of construction of the invention in which:

FIG. 1 shows a map of France and a device for counting stages;

FIG. 2 shows part of the map of France, on an enlarged scale, indicating names of towns and distances between towns;

Figures 3, 4:
FIG. 3 is a view of a peg (which may be replaced by a counter or a small figure)
FIG. 4 shows a view of a board for recording stage points which comprises four columns.

According to the method of construction shown in FIGS. 1 and 2, a map of France 1 comprises a certain number of perforations 2, each perforation representing a town, the towns being interconnected by a network of roads 3, these roads being shown by means of straight lines joining two towns. Alongside the roads there are numbers 4 indicating the number of kilometres separating two towns. A device for counting stages 5 comprises the same number of perforations as the map. At the start, each of the perforations in the stage-counting device contains a peg 6.

In addition, the game also comprises a device for recording stage points, as shown in FIG. 4. This recording device is a board bearing, in adjacent columns and in increasing order from bottom to top, all the numbers in units, tens, hundreds and thousands.

This recording device facilitates adding by providing a certain degree of automation. Let us assume that 28 and 45 have to be added together. At the start, there is a peg in each of the holes marked "zero." The number 28 is marked up first by placing the unit peg against the figure 8 and the tens peg against the figure 2. To make the addition, the unit peg is moved forward five holes, but this makes it necessary, on reaching 9, to come back down the same column to zero at the bottom of the board to reach the next hole. Because it has been necessary to return to zero in the unit column, the peg in the tens column is advanced one hole, and the operation is continued by moving the tens column peg forward once the unit column peg has been moved forward as much as possible.

In fact, the moving forward of a peg in a column is done from bottom to top, and continues by a return to zero once nine is reached, each return to zero in a column giving rise to the moving forward one hole of the peg in the next higher column.

Each player has the equipment described above, as well as a small figure intended to move around the map; this small figure is, e.g., a racing cyclist. In order to indicate the winner at the end of each stage, the game as a whole may include a small coloured figure of a racing cyclist to represent the leader, which passes from one winner to the next during the game and is awarded to the person who, at a given moment, has the least number of points over the preceding stages as a whole.

As an indication, we give below an example of the rules applicable to this game when each player has a map of France, a stage-counting device, and a board for recording stage points, with, of course, all the accessories, i.e., pegs, small figures and numbered counters for drawing lots for each player's town of departure. Each town may be assigned a number on a list.

A team leader is chosen. He puts the numbered counters in the plastic bag (the leading racer is set aside).

Each player draws a number which represents a town. Each player places his racer on the town which he drew.

From this point of departure, each player makes a Tour de France in 114 stages on his own map, passing successively through all the towns (there are 114 of them, plus Paris), ending up in Paris, which is the last stage and the end of the game.

The team leader starts the players on each stage which all carry out at the same time (each on his own map). When all the players have finished a stage, the next one is begun, and so on.

A stage is played as follows: each player removes a peg from his stage-counting device which is numbered from 1 to 114. The counting device 5 of FIG. 1 has the peg holes numbered in order, but marking is not shown because of the size of the drawing. He removes the pegs in numerical order, beginning with No. 1. The number of the peg removed represents the number of the stage to be played. The team leader announces the number at the start of each stage. Each player removes his racer from the town in which it is and moves it towards another town which he chooses (one town per stage) and inserts the peg in the town which the racer has just left. The presence of the peg indicates that the town has been occupied. The racer is positioned with the peg of its front wheel in the town of arrival, and the back wheel pointing in the direction of the town it has just left, so that the bicycle lies along the road it has just covered. When the racer has been positioned, it cannot be removed and placed elsewhere.

The player chooses his itinerary freely. He may go in any direction, but only along the roads shown. Thus, the players, although they cover their stages simultaneously, will each be on different roads throughout the game. Only at the end of the game do they all end up in Paris, which each player will have reached by following a different itinerary.

Each road connects two towns. On leaving each town, roads going in different diections lead towards other towns. When the player has chosen one of the roads leaving the town where he is, he must go straight along it and stop at the town where that road ends. He may not go through that town without occupying it. When a road is intersected by another road, he may not leave his road partway along and turn off along the intersecting road.

At each stage, therefore, the player chooses one of the roads leading out of the town where he is and stops at the town where that road ends, and so on until he reaches Paris, after having occupied all the towns on the map.

It is not permissible to stop in Paris before having occupied all the other towns on the map.

When a player comes to a dead end, he may cross towns he has already occupied (with the exception of Paris, which may never be crossed).

By crossing a town which has already been occupied, the player incurs a penalty. These penalties being extremely costly, the player must maneuver intelligently so as not to come to a dead end (or as infrequently as possible) before he reaches Paris.

Just as in the case of ordinary travelling, occupied towns can only be crossed along roads drawn on the map.

There are two ways of "coming to a dead end":

(1) When the racer is at a dead end: all the roads leading out of the town where he is, lead to towns which are already occupied;

(2) When a town is cut off: a town as yet unoccupied which is completely cut off from outside by occupied towns encircling it on all sides and which a racer cannot reach except by crossing occupied towns. Now, being obliged to occupy this cut-off town (since all towns have to be occupied during the game), he has to cross all the towns which separate him from this one, incurring the penalties laid down. Then he has to get out of the cut-off town by crossing occupied towns again, which involves him in more penalties. This is why this second case is generally more costly in penalties than the first, and it is nearly always the result of an oversight, the player having occupied all the towns in a certain sector while forgetting one of them.

At the end of each stage, the player marks the points incurred in the stage just completed, i.e., the figure which is written on the map, along the road he has just travelled. This figure, which is expressed in "points," indicates the length of the road between the two towns it connects, a higher figure indicating a longer road.

Stage points are marked on the board for recording stage points. When all the players have marked their stage points, the team leader says: "Add up your points," and each player adds his stage points to the previous total. In this way, the total of points incurred during all previous stages is known at the end of each stage.

The player with the smallest points total becomes the leader (with the leading racer which was left in the box). At the end of the first stage, the stage points also represent the total.

In this way, during the whole game, the team leader checks each player's total at the end of each stage and the leadership goes each time to the player who, at that time, has the smallest points total. Of course, leadership stays with the same player as long as he retains the smallest points total.

If two players are in the lead with equal points, the leading racer is set aside until such time as there is only one player in the lead.

The player who assumes the leadership removes his own racer, which he sets aside, and he places the leading racer in the town from which he has just removed his own racer. The player who loses the leadership hands the leading racer to his successor and replaces his own racer in that position.

The fact of having the leadership during the game has no bearing on the final result.

All players arrive in Paris at the same time.

The player who has the leadership on arrival in Paris, i.e., who has finished the tour with the smallest final points total, will be the winner of the Tour (even if he only obtained the leadership during the last stage).

The important thing in this game, therefore, is to use the shortest roads and avoid coming to a dead end.

When a racer is at a dead end (Case No. 1 explained above), he may cross all the occupied towns which are on his route in one stage (without stopping) and stop in the unoccupied town of his choice, leaving the stage peg in the cut-off town from which he set out.

The points he will have incurred in this stage are as follows:

(1) 100 penalty points for each occupied town he crossed. On the other hand, the points for the roads taken to cross the occupied towns do not count.

(2) He must add to the total penalty points the points for the road going from the last occupied town which he crossed to the town of arrival.

When a town is cut off (Case No. 2 explained above), he may cross all the occupied towns which separate him from the cut-off town in one stage (incurring 100 points for the crossing of each occupied town) and stop in the cut-off town, leaving his stage peg in the town of departure.

During the following stage he may, also in one go, leave the cut-off town, again cross all the occupied towns in his way and stop in the unoccupied town of his choice, leaving his stage peg in the cut-off town he has just left.

A second set of rules may also be laid down for cases where the players do not use the device for recording stage points.

The rules already quoted regarding the use of roads and the occupation of all the towns on the map remain in force, Paris being the last town to be occupied and which may never be crossed.

However, these rules differ from the first set in three respects:

(1) This game is played without points being allocated. The points for roads do not count and the calculation board is not used.

The result is that the lengths of the roads used when travelling are not important.

(2) The dead end penalties are different from the first system. Here, when a player is at a dead end and has to cross occupied towns, he loses a stage for each occupied town which he crosses.

In fact, contrary to the first system, he is obliged to stop in each occupied town which he crosses and he may only do one town per stage.

This is how he goes about it: he removes the peg from the occupied town to which he is going, puts his racer there, and puts the peg which he has just removed from the occupied town in the town which his racer has just left. Briefly, the peg from the occupied town and the racer simply change places. On the next stage, he does the same thing, and so on until he has crossed all the occupied towns, and only when he can stop in an unoccupied town can he removed another peg from his numbered grid 5. In this way the player who has come to a dead end will be stages behind his opponents (one stage behind for each occupied town he crossed), and his opponents will reach Paris before he does (providing they do not come to a dead end themselves in the meantime).

(3) The winner of the Tour is the player who reaches Paris first, after having occupied all the other towns. This winner will be the player who comes to a dead end less often than his opponents.

The player who, during the game, manages to get a lead of one stage over his opponents and is in the lead alone, takes the leadership. He removes his racer, sets it aside and puts the leading racer in its place.

The team leader takes stock of the players' positions at the end of each stage.

A player may retain the leadership as long as he stays in the lead alone. When he is joined by an opponent and there are thus two players in the lead, he puts the leading racer back in the box and places his own racer in the position from which he has just removed the leading racer. The leading racer remains in the box until such time as there is only one person in the lead again. When a holder of the leadership is passed by an opponent, he hands over the leadership to his successor. The latter substitutes the leading racer for his own racer, which he sets aside, while his predecessor puts his own racer in the place of the leading racer he has just removed.

The fact of having the leadership during the game does not count in the final win. Even if a player has the leadership for the whole game, if an opponent passes him during the last stage, the latter is the winner of the Tour, as the winner is the one who reaches Paris first.

The game has been described with the Tour de France as the theme, but obviously the map may be a map of another country or several other countries and the theme can be, e.g., the Monte Carlo Rally, the small figures then being cars, or any other sporting or tourist theme.

The invention has been described and illustrated as a non-limiting example only and, needless to say, many modifications may be made thereto without thereby departing from the basic idea.

I claim:

1. Means for playing a board game, comprising a plurality of identical copies of a map, one for each player, each said map comprising a plurality of perforations each representing a town in a country, the arrangement of the perforations being the same on each map, and a plurality of counting units for insertion in said perforations, a plurality of paths between adjacent perforations and numbers indicating on said map the lengths of said paths, in combination with a stage-counting device comprising as many perforations as there are perforations on the map and each such perforation containing one of said counting units, and a device for recording points.

2. Means for playing a board game, as claimed in claim 1, wherein the counting units consist of pegs adapted to be placed in the perforations marking the towns.

3. Means for playing a board game, as claimed in claim 1, wherein the device for recording points consists of a board on which the figures 0 to 9 are arranged in vertical columns, in increasing order from the bottom, all the columns being identical and representing, in increasing order from right to left, the units, tens, hundreds and thousands, perforations being provided against each figure in each column to make it possible to mark up a number on the board by means of pegs.

References Cited

UNITED STATES PATENTS

| | | | |
|---|---|---|---|
| 707,469 | 8/1902 | Wayts | 273—134 |
| 1,451,511 | 4/1923 | Jones | 273—134 |
| 1,551,895 | 9/1925 | Magar | 273—131 |
| 1,552,078 | 9/1925 | Paulson | 273—134X |
| 2,479,747 | 8/1949 | Lachance | 273—134 |
| 2,729,451 | 1/1956 | Larson | 273—134 |

FOREIGN PATENTS

| | | | |
|---|---|---|---|
| 863,274 | 1/1941 | France | 273—134 |
| 903,699 | 1/1945 | France | 273—134 |
| 196,655 | 4/1923 | Great Britain | 273—134 |

DELBERT B. LOWE, Primary Examiner